United States Patent
Xu et al.

(10) Patent No.: US 12,444,791 B2
(45) Date of Patent: Oct. 14, 2025

(54) BATTERY

(71) Applicant: CALB Co., Ltd., Jiangsu (CN)

(72) Inventors: Jiuling Xu, Changzhou (CN); Yongjie Zhang, Luoyang (CN); Lulu Zhang, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 498 days.

(21) Appl. No.: 17/975,531

(22) Filed: Oct. 27, 2022

(65) Prior Publication Data

US 2023/0420772 A1    Dec. 28, 2023

(30) Foreign Application Priority Data

Jun. 28, 2022  (CN) .......................... 202210749564.X

(51) Int. Cl.
*H01M 50/119* (2021.01)
*H01M 50/145* (2021.01)
*H01M 50/159* (2021.01)

(52) U.S. Cl.
CPC ....... *H01M 50/119* (2021.01); *H01M 50/145* (2021.01); *H01M 50/159* (2021.01)

(58) Field of Classification Search
CPC . H01M 50/119; H01M 50/159; H01M 50/145
See application file for complete search history.

(56) References Cited

U.S. PATENT DOCUMENTS

2012/0301759 A1* 11/2012 Yoshitake ............ H01M 50/119
429/94

FOREIGN PATENT DOCUMENTS

| CN | 207124213 | 3/2018 |
|---|---|---|
| CN | 217589160 | 10/2022 |
| JP | H10208777 | 8/1998 |
| WO | 9930377 | 6/1999 |

OTHER PUBLICATIONS

JPH10208777 translation (Year: 1998).*
CN207124213 translation (Year: 2018).*
"Search Report of Europe Counterpart Application", issued on Oct. 19, 2023, p. 1-p. 9.
"Office Action of China Counterpart Application", issued on Jun. 29, 2025, p. 1-p. 7.
"Office Action of India Counterpart Application", issued on Jul. 30, 2025, p. 1-p. 9.

* cited by examiner

*Primary Examiner* — Jane J Rhee
(74) *Attorney, Agent, or Firm* — JCIP GLOBAL INC.

(57) ABSTRACT

A battery includes a first casing. The first casing includes a first metal piece and a second metal piece disposed inside the first metal piece, such that the first metal piece forms an outer surface of the first casing and the second metal piece forms an inner surface of the first casing. A material of the first metal piece is inconsistent with a material of the second metal piece. A corrosion potential of the second metal piece is higher than a corrosion potential of the first metal piece, and the corrosion potential of the second metal piece is higher than a negative electrode potential of the battery.

7 Claims, 3 Drawing Sheets

BATTERY

CROSS-REFERENCE TO RELATED APPLICATION

This application claims the priority benefits of China application serial no. 202210749564.X, filed on Jun. 28, 2022. The entirety of the above-mentioned patent application is hereby incorporated by reference herein and made a part of this specification.

BACKGROUND

Technical Field

The disclosure relates to the technical field of batteries, and in particular, relates to a battery.

Description of Related Art

In the related art, the battery casing is generally an aluminum casing. Compared with other metal composite casings, the aluminum casing requires lower costs and is easier to form, but the aluminum casing is prone to electrochemical corrosion during use.

SUMMARY

The disclosure provides a battery.

The disclosure provides a battery. The battery includes a first casing, and the first casing includes a first metal piece and a second metal piece. The second metal piece is disposed inside the first metal piece, such that the first metal piece forms an outer surface of the first casing and the second metal piece forms an inner surface of the first casing. A material of the first metal piece is inconsistent with a material of the second metal piece. A corrosion potential of the second metal piece is higher than a corrosion potential of the first metal piece, and the corrosion potential of the second metal piece is higher than a negative electrode potential of the battery.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
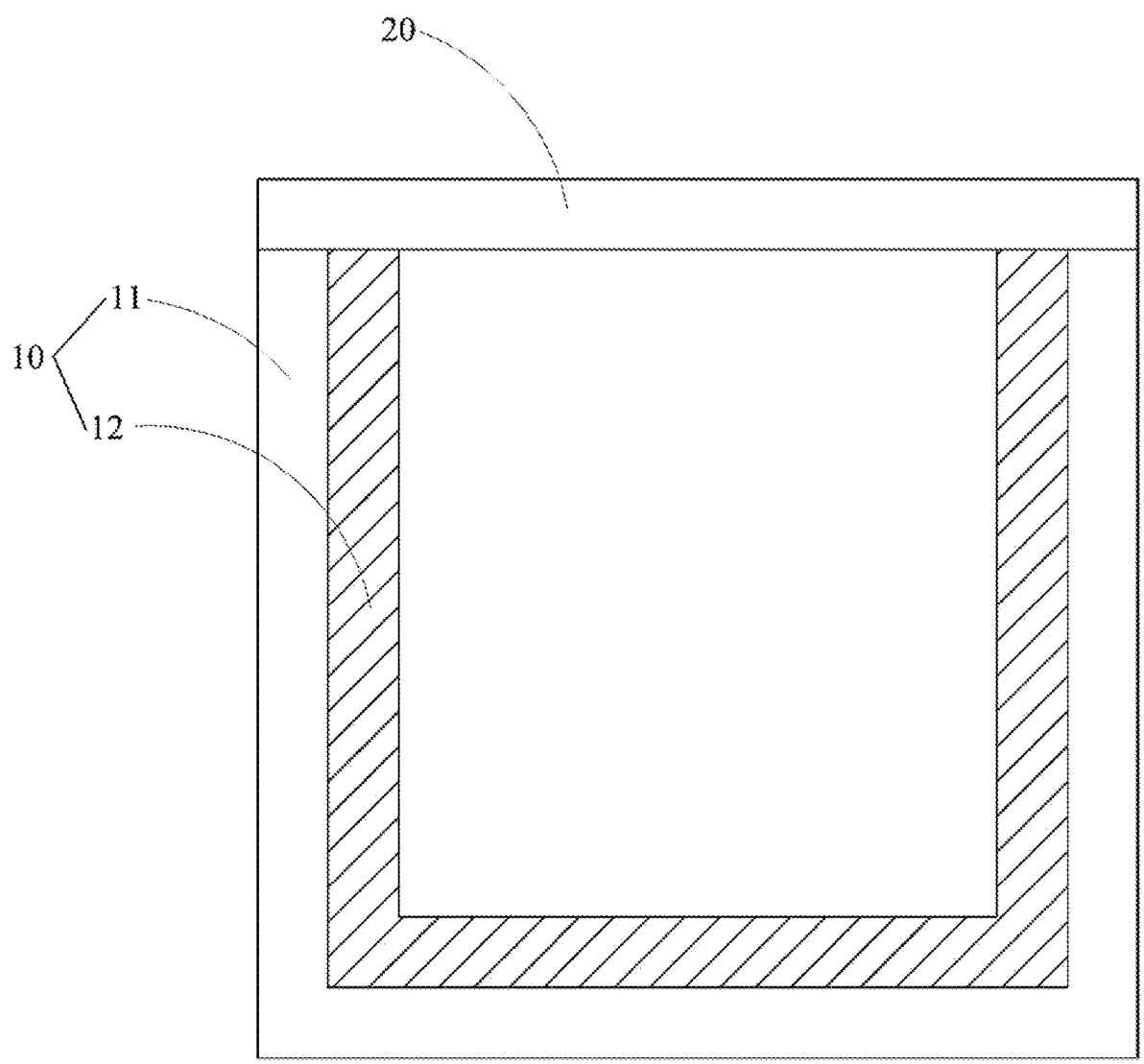
FIG. 1 is a schematic view illustrating a partial structure of a battery according to a first exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

An embodiment of the disclosure provides a battery. With reference to FIG. 1 to FIG. 4, the battery includes a first casing 10, and the first casing 10 includes a first metal piece 11 and a second metal piece 12 disposed inside the first metal piece 11, such that the first metal piece 11 forms an outer surface of the first casing 10 and the second metal piece 12 forms an inner surface of the first casing 10. The material of the first metal piece 11 is inconsistent with the material of the second metal piece 12. The corrosion potential of the second metal piece 12 is higher than the corrosion potential of the first metal piece 11, and the corrosion potential of the second metal piece 12 is higher than the negative electrode potential of the battery.

The battery provided by an embodiment of the disclosure includes the first casing 10. By arranging the first casing 10 to be provided with the first metal piece 11 and the second metal piece 12, and by arranging the second metal piece 12 to be disposed inside the first metal piece 11, such that the first metal piece 11 forms the outer surface of the first casing 10 and the second metal piece 12 forms the inner surface of the first casing 10. Further, the corrosion potential of the second metal piece 12 is higher than the corrosion potential of the first metal piece 11, and the corrosion potential of the second metal piece 12 is higher than the negative electrode potential of the battery, that is, the corrosion potential of the second metal piece 12 is relatively high. In this way, electrochemical corrosion is prevented from occurring in the second metal piece 12, and the service life of the first casing 10 is thereby improved. Further, the safety performance of the first casing 10 is ensured, so as to improve the safety performance of the battery.

It is noted that the second metal piece 12 is disposed inside the first metal piece 11, that is, the second metal piece 12 may be embedded in the first metal piece 11, so that the second metal piece 12 forms the inner surface of the first casing 10. During the use of the battery, the electrolyte is also in contact with the second metal piece 12, but not substantially in contact with the first metal piece 11. Therefore, it can be considered that the electrolyte may not cause electrochemical corrosion to the first metal piece 11. The second metal piece 12 is in contact with the electrolyte, if the corrosion potential of the second metal piece 12 is lower, electrochemical corrosion may occur. In the related art, the casing is mostly made of aluminum, and lithium-aluminum alloy is easily formed when the aluminum casing and the negative tab are connected, resulting in generation of electrochemical corrosion on the casing. In this embodiment, by making the corrosion potential of the second metal piece 12 higher than the corrosion potential of the first metal piece 11, and by the corrosion potential of the second metal piece 12 higher than the negative electrode potential of the battery, electrochemical corrosion is prevented from occurring in the second metal piece 12. For instance, the second metal piece 12 is in contact with the negative tab of the cell, but since the corrosion potential of the second metal piece 12 is higher than the negative electrode potential of the battery, herein, ions in the electrolyte may be prevented from being embedded in the lattice of the second metal piece 12.

Regarding the arrangement of the second metal piece 12 being disposed inside the first metal piece 11, the second metal piece 12 may be arranged inside the first metal piece 11 after the second metal piece 12 and the first metal piece 11 are individually formed. Alternatively, the second metal piece 12 and the first metal piece 11 are integrally formed, for example, two flat plates are selected, and the first casing 10 is formed between these two flat plates by stamping.

In an embodiment, as shown in FIG. 1 to FIG. 4, the battery further includes a second casing 20, and the second casing 20 is connected to the first casing 10. The second casing 20 includes a third metal piece. The material of the third metal casing is inconsistent with the material of the second metal piece 12. The corrosion potential of the second metal piece 12 is higher than the corrosion potential of the third metal piece. In order to prevent electrochemical corrosion from occurring in the second metal piece 12, the second casing may be made of materials with lower costs and easy molding. It is ensured that the costs of the battery may be controlled, and further, the molding efficiency of the second casing 20 may be improved.

In an embodiment, the first casing 10 is formed with an accommodating space, and the second casing 20 is a cover plate. The first casing 10 may be in contact with the electrolyte, and the base probability of the second casing 20 and the electrolyte may be lower. Therefore, by arranging the first casing 10 to be provided with the first metal piece 11 and the second metal piece 12, by arranging the second metal piece 12 to form the inner surface of the first casing 10, and by allowing the corrosion potential of the second metal piece 12 to be higher than the corrosion potential of the first metal piece 11 and the corrosion potential of the second metal piece 12 to be higher than the negative electrode potential of the battery, electrochemical corrosion is prevented from occurring in the second metal piece 12, and the service life of the first casing 10 is thereby improved. The second casing 20 may be made of materials with lower costs and easy molding, it thus can be ensured that the costs of the battery may be controlled, and further, the molding efficiency of the second casing 20 may be improved.

In an embodiment, the material of the third metal piece is consistent with the material of the first metal piece 11, and the first metal piece 11 is connected to the third metal piece. That is, the third metal piece and the first metal piece 11 of the same material are easier to form a stable connection, so that the connection stability of the battery is improved, the sealing performance of the battery is ensured, and the battery is safe to use and exhibits improved performance.

In an embodiment, the first metal piece 11 and the third metal piece may be welded. Since the material of the third metal piece is the same as the material of the first metal piece 11, high quality welding strength is ensured.

In an embodiment, the first metal piece 11 includes aluminum, the second metal piece 12 includes copper, and the third metal piece includes aluminum, so it can be ensured that the second metal piece 12 has a higher corrosion potential, and further, the materials of the first metal piece 11 and the second casing 20 may be made lighter and may be easier to form.

In some embodiments, the first metal piece 11 includes aluminum, the second metal piece 12 includes steel, and the third metal piece includes aluminum.

In an embodiment, the second metal piece 12 is insulated from the third metal piece, so it can be ensured that the second metal piece 12 is prevented from being electrically connected to the third metal piece directly, and further, the probability of the electrolyte contacting the third metal piece may be reduced, so as to realize protection for the second casing 20.

Figure 2:
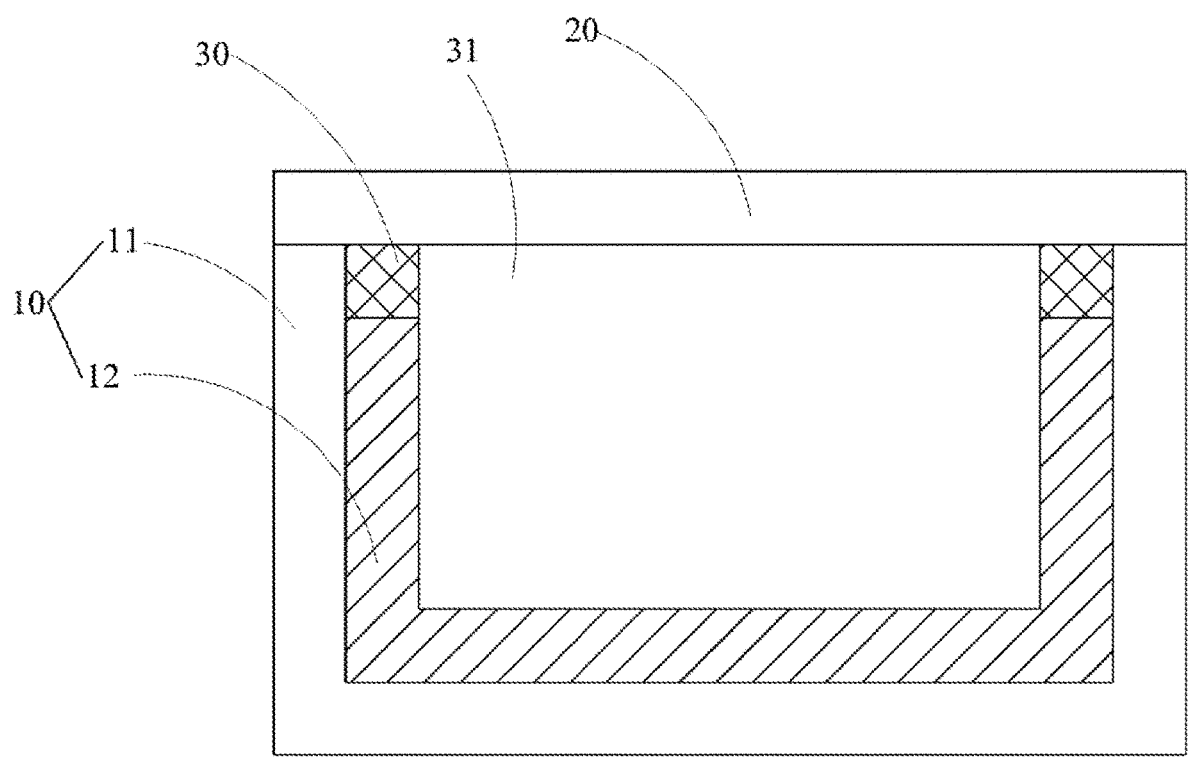
FIG. 2 is a schematic view illustrating a partial structure of a battery according to a second exemplary embodiment.
Figure 3:
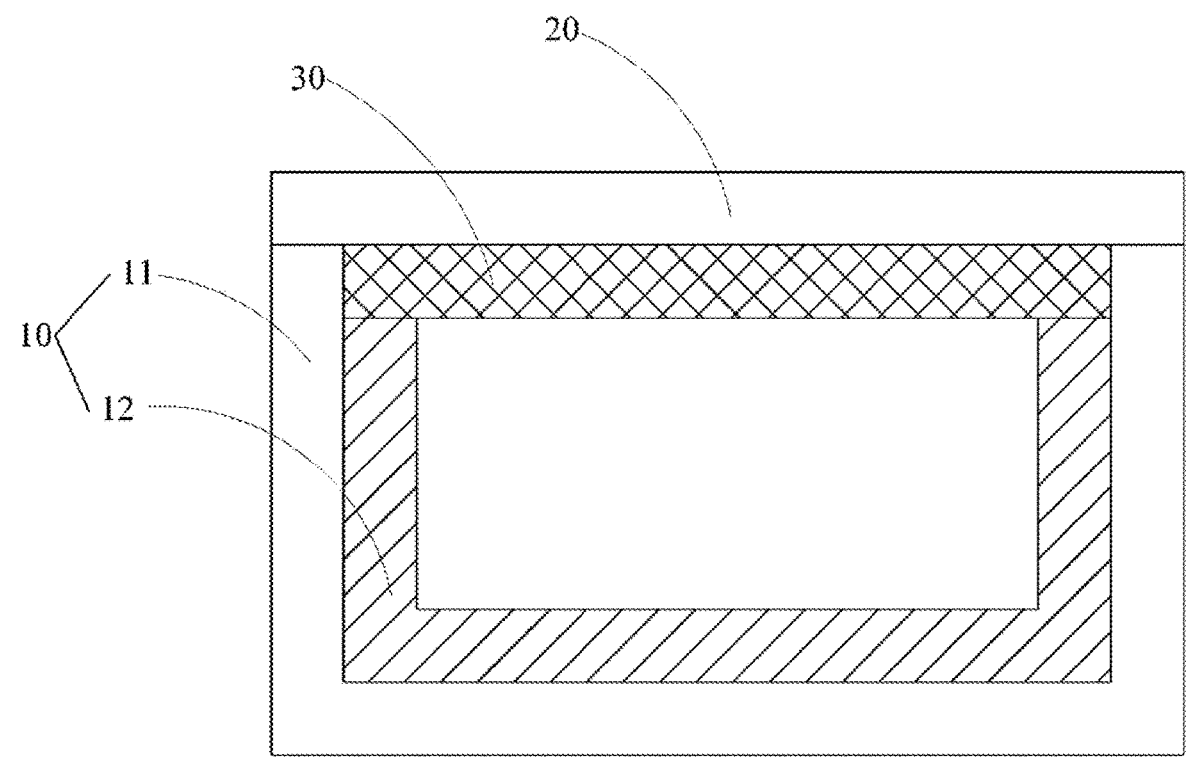
FIG. 3 is a schematic view illustrating a partial structure of a battery according to a third exemplary embodiment.

In an embodiment, as shown in FIG. 2 and FIG. 3, the battery further includes an insulating structure 30. The insulating structure 30 is disposed between the second metal piece 12 and the third metal piece, and in this way, insulation protection for the second metal piece 12 and the third metal piece are realized, and a certain degree of sealing may be formed between the second metal piece 12 and the third metal piece.

The insulating structure 30 may be insulating glue, or the insulating structure 30 may be an insulating block, such as a plastic block, a rubber block, or the like.

In an embodiment, as shown in FIG. 2, the insulating structure 30 is formed with a through hole 31. That is, the through hole 31 may release the opening of the second metal piece 12, so that the cell inside the second metal piece 12 may be connected to the second casing 20 through the through hole 31. Alternatively, the cell inside the second metal piece 12 may be connected to a terminal component on the second casing 20 through the through hole 31.

It should be noted that the cell may be electrically connected to the second casing 20 directly, and herein, a tab of the cell may be connected to the second casing 20 through the through hole 31. Alternatively, a terminal component may be provided on the second casing 20, and the tab of the cell may be connected to the terminal component through the through hole 31. After the connection between the tab of the cell and the second casing 20 or the connection between the tab of the cell and the terminal component is completed, other avoidance structures may be used to seal the through hole 31, so as to prevent the electrolyte from contacting the second casing 20. Alternatively, the through hole 31 may only allow the tab or the conductive structure connected to the tab to pass therethrough, such that the electrolyte may also be prevented from contacting the second casing 20.

In an embodiment, as shown in FIG. 3, the insulating structure 30 seals the opening of the second metal piece 12, and in this way, the electrolyte is completely prevented from contacting the second casing 20, and electrochemical corrosion is prevented from occurring in the second casing 20.

Figure 4:
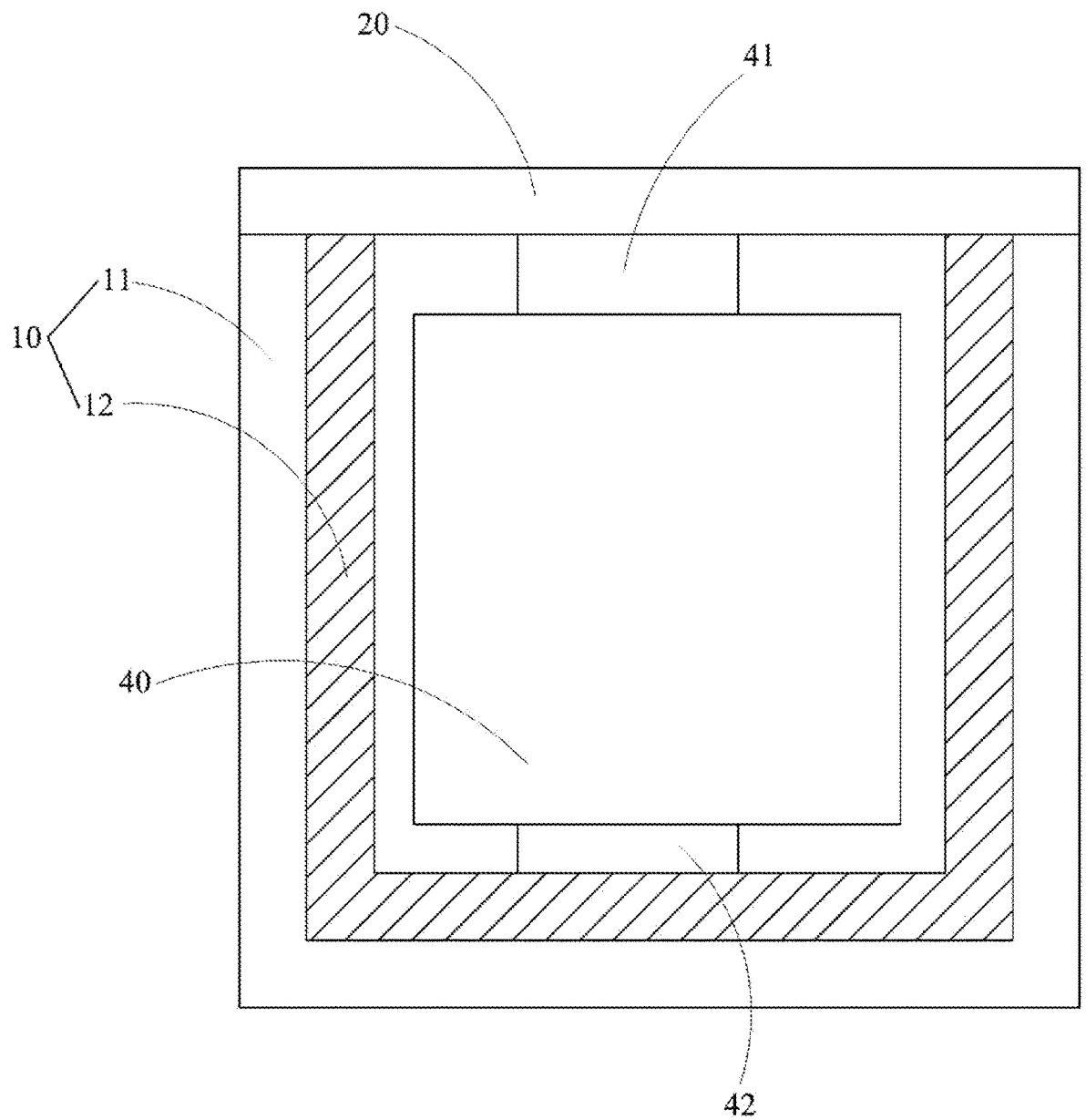
FIG. 4 is a schematic view of a structure of a battery according to an exemplary embodiment.

In an embodiment, as shown in FIG. 4, the second casing 20 is insulated from the first casing 10. The battery further includes a cell 40, the cell 40 includes a positive tab 41 and a negative tab 42, and the positive tab 41 and the negative 42 are respectively connected to the third metal piece and the second metal piece 12. Therefore, ions in the electrolyte are effectively prevented from intercalating into the lattice of the second metal piece 12, and electrochemical corrosion is thus prevented from occurring in the second casing 20 and the first casing 10.

The second casing 20 may be made of aluminum, the first metal piece 11 of the first casing 10 is made of aluminum, and the second metal piece 12 of the first casing 10 is made of copper. The positive tab 41 of the cell 40 is electrically connected to aluminum, and the negative tab 42 of the cell 40 is electrically connected to copper. Therefore, lithium ions are effectively prevented from engaging with the lattice of aluminum, and the formation of lithium aluminum alloys is prevented from occurring. In this way, it can be ensured that the first casing 10 and the second casing 20 have sufficient structural strength, so as to ensure that the battery is safe to use and exhibits improved performance.

In an embodiment, the cell 40 may include a cell body, the positive tab 41, and the negative tab 42. The positive tab 41 and the negative tab 42 may be respectively located on opposite sides of the cell body, the positive tab 41 may extend from one side of the cell body in a first direction, and the negative tab 42 may extend from the other side of the cell body in a second direction. The first direction and the second direction are opposite to each other, so that the positive tab 41 and the negative tab 42 are respectively connected to the third metal piece and the second metal piece 12 easily. Alternatively, the positive tab 41 and the negative tab 42 may extend from the same side of the cell body.

The cell body includes two or more electrode pieces, each tab portion includes two or more single-piece tabs, and the single-piece tabs respectively extend from the corresponding electrode pieces. The width of each single-piece tab may be less than the width of each electrode piece. Multiple single-piece tabs are stacked to form each tab portion and are connected to the electrode lead-out structures. The single-piece tabs are made of metal foils with great electrical and thermal conductivity, such as aluminum, copper, or nickel.

It is noted that the positive tab 41 and the negative tab 42 are respectively connected to the third metal piece and the second metal piece 12. Alternatively, the battery may further include a positive terminal component and a negative terminal component, and the positive tab 41 and the negative tab 42 may be respectively connected to the positive terminal component and the negative terminal component. Alternatively, the battery may further include the positive terminal component, and the positive tab 41 and the negative tab 42 may be respectively connected to the positive terminal component and the second metal piece 12. Alternatively, the battery may further include the negative terminal component, and the positive tab 41 and the negative tab 42 may be respectively connected to the third metal piece and the negative terminal component.

In an embodiment, the battery is a laminated battery, which is conveniently assembled and may be further processed to obtain a battery with a longer length.

The battery includes the cell 40 and an electrolyte, and the battery is the smallest unit capable of performing electrochemical reactions such as charging/discharging. The cell refers to a unit formed by winding or laminating a stacked portion, and the stacked portion includes a first electrode piece, a separator, and a second electrode piece. When the first electrode piece is a positive electrode piece, the second electrode piece is a negative electrode piece. The polarities of the first electrode piece and the second electrode piece may be interchanged.

To be specific, the cell 40 is a laminated cell. The cell 40 has first electrode pieces that are stacked on each other, second electrode pieces whose electrical properties are opposite to the first electrode pieces, and diaphragm pieces disposed between the first electrode pieces and the second electrode pieces. Therefore, multiple pairs of the first electrode pieces and the second electrode pieces are stacked to form the laminated cell.

Optionally, the battery may be a roll core. That is, the first electrode pieces, the second electrode pieces having electrical property that is opposite to the first electrode pieces, and the diaphragm pieces disposed between the first electrode pieces and the second electrode pieces are wound to obtain a roll core.

An embodiment of the disclosure further provides a battery apparatus, and the battery apparatus includes the abovementioned battery.

The battery of the battery apparatus provided by an embodiment of the disclosure includes the first casing 10. By arranging the first casing 10 to be provided with the first metal piece 11 and the second metal piece 12, and by arranging the second metal piece 12 to be disposed inside the first metal piece 11, the first metal piece 11 thereby forms the outer surface of the first casing 10 and the second metal piece 12 forms the inner surface of the first casing 10. Further, the corrosion potential of the second metal piece 12 is higher than the corrosion potential of the first metal piece 11, and the corrosion potential of the second metal piece 12 is higher than the negative electrode potential of the battery, that is, the corrosion potential of the second metal piece 12 is relatively high. In this way, electrochemical corrosion is prevented from occurring in the second metal piece 12, and the service life of the first casing 10 is thereby improved. Further, the safety performance of the first casing 10 is ensured, so the battery apparatus is safe to use and exhibits improved performance.

In an embodiment, the battery apparatus is a battery module or a battery pack.

The battery module includes a plurality of batteries, and the battery module may further include end plates and side plates. The end plates and the side plates are configured to secure the plurality of batteries.

It is noted that a plurality of batteries may be formed into a battery module and then arranged in the battery box, and the plurality of batteries may be secured by the end plates and the side plates. The plurality of batteries may be directly disposed in the battery box, that is, the plurality of batteries are not required to be arranged into groups, and the end plates and the side plates may be removed at this time.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising a first casing, wherein the first casing comprises:
    a first metal piece; and
    a second metal piece, wherein the second metal piece is disposed inside the first metal piece, such that the first metal piece forms an outer surface of the first casing, and that the second metal piece forms an inner surface of the first casing, and a material of the first metal piece is inconsistent with a material of the second metal piece,
    wherein a corrosion potential of the second metal piece is higher than a corrosion potential of the first metal piece, and the corrosion potential of the second metal piece is higher than a negative electrode potential of the battery,
    wherein the battery further comprises a second casing, the second casing is connected to the first casing, the second casing comprises a third metal piece, a material of the third metal casing is inconsistent with the material of the second metal piece, and the corrosion potential of the second metal piece is higher than a corrosion potential of the third metal piece,
    wherein the material of the third metal piece is consistent with the material of the first metal piece, and the first metal piece is connected to the third metal piece,
    wherein the second metal piece is insulated from the third metal piece.

2. The battery according to claim 1, further comprising:
    an insulating structure, wherein the insulating structure is disposed between the second metal piece and the third metal piece.

3. The battery according to claim 2, wherein the insulating structure is formed with a through hole, or the insulating structure seals an opening of the second metal piece.

4. The battery according to claim 1, wherein the first metal piece is welded to the third metal piece.

5. The battery according to claim 1, wherein the second casing is insulated from the first casing, the battery further comprises a cell, the cell comprises a positive tab and a negative tab, and the positive tab and the negative tab are respectively connected to the third metal piece and the second metal piece.

6. The battery according to claim 1, wherein the first metal piece comprises aluminum and the second metal piece comprises copper.

7. The battery according to claim 1, wherein second casing is a cover plate.

* * * * *